(12) United States Patent
Laceky

(10) Patent No.: US 7,191,559 B1
(45) Date of Patent: Mar. 20, 2007

(54) FISHING ACCESSORY AND ASSOCIATED METHODS

(76) Inventor: William P. Laceky, 115 Retama Dr., Georgetown, TX (US) 78626

( * ) Notice: Subject to any disclaimer, the term of this patent is extended or adjusted under 35 U.S.C. 154(b) by 0 days.

(21) Appl. No.: 11/031,282

(22) Filed: Jan. 6, 2005

Related U.S. Application Data

(60) Provisional application No. 60/534,513, filed on Jan. 6, 2004.

(51) Int. Cl.
*A01K 87/00* (2006.01)
*A01K 97/10* (2006.01)
*A01K 69/00* (2006.01)

(52) U.S. Cl. ............... 43/25.2; 43/25; 43/21.2; 43/4.5

(58) Field of Classification Search ............ 43/22, 43/25.2, 25, 21.2, 26, 405; 242/316, 323; D22/139, 144, 138
See application file for complete search history.

(56) References Cited

U.S. PATENT DOCUMENTS

| | | | | |
|---|---|---|---|---|
| 468,227 A | * | 2/1892 | PFlueger | 43/25.2 |
| 1,269,743 A | * | 6/1918 | Richmond | 43/25.2 |
| 2,028,477 A | * | 1/1936 | Rupp | 43/25.2 |
| 2,514,645 A | * | 7/1950 | Jardine | 43/25.2 |
| 2,791,054 A | * | 5/1957 | Gronek | 43/25.2 |
| 2,833,075 A | * | 5/1958 | Herron | 43/25.2 |
| 3,026,644 A | * | 3/1962 | Raider | 43/19 |
| 3,164,334 A | * | 1/1965 | Gris | 242/323 |
| 3,281,981 A | | 11/1966 | Dykhouse | |
| 3,521,393 A | * | 7/1970 | Gordon | 43/17 |
| 3,815,273 A | | 6/1974 | Perkins | |
| 4,457,095 A | * | 7/1984 | Stevenson | 43/25.2 |
| 4,498,641 A | * | 2/1985 | Steudle | 248/309.1 |
| 4,667,433 A | * | 5/1987 | Thompson, Jr. | 43/25.2 |
| 4,831,772 A | * | 5/1989 | Gillespie | 43/54.1 |
| 5,160,257 A | * | 11/1992 | Tsengas | 43/25 |
| 5,214,874 A | * | 6/1993 | Faulkner | 43/25.2 |
| 5,448,851 A | * | 9/1995 | Nyberg | 43/25.2 |
| 5,564,215 A | | 10/1996 | Phelps | |
| D407,792 S | | 4/1999 | Crooker | |
| 6,014,831 A | | 1/2000 | Curry | |
| 6,023,876 A | * | 2/2000 | Haddad et al. | 43/25.2 |
| 6,070,822 A | | 6/2000 | Zwayer et al. | |
| D465,255 S | * | 11/2002 | Lankey | D22/139 |
| 6,559,387 B1 | * | 5/2003 | Franks | 174/136 |

OTHER PUBLICATIONS

Printout (4 pages) showing prior art devices including: (1) Bass Pro Shops Bait keeper, (2) Fuji EZ Hookkeeper, (3) Hook Bonnets, (4) Bass Pro Shops XPS Hook Holders (5) Bass Pro Shops Lure Wraps, (6) Wire Loop, (7) Hook-Hider rod handle, (8) Fuji EZ Hookkeeper, (9) Snap-A-Lure, (10) Cabela's Lure Keeper, (11) Lindy Hook-A-Loop.
Brochure for Hawg Pockets, www.howgpockets.com, publication date unknown, but at least as early as Jan. 2006.

* cited by examiner

*Primary Examiner*—Teri Pham Luu
*Assistant Examiner*—Joshua Michener
(74) *Attorney, Agent, or Firm*—Johnson & Associates

(57) ABSTRACT

A method and apparatus is provided relating to the use of fishing accessories attached to a fishing rod or reel. A fishing accessory, such as a fish hook retainer, can be attached to a fishing rod using a device with a shape suitable to be clamped between the mounting flange of a fishing reel and a fishing rod and/or reel clamp of the fishing rod. A fish hook retainer includes a pocket for retaining a fish hook, while protecting the point and barb of the hook from exposure.

4 Claims, 5 Drawing Sheets

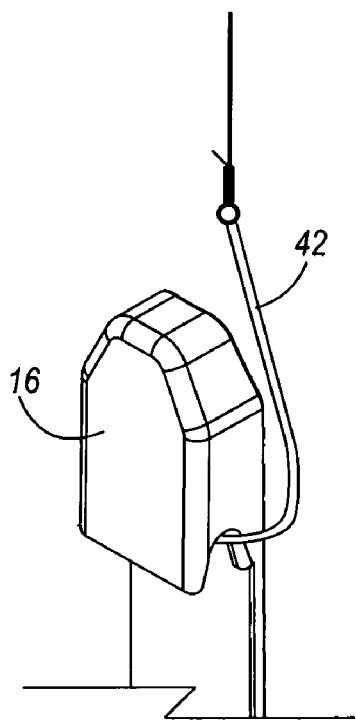
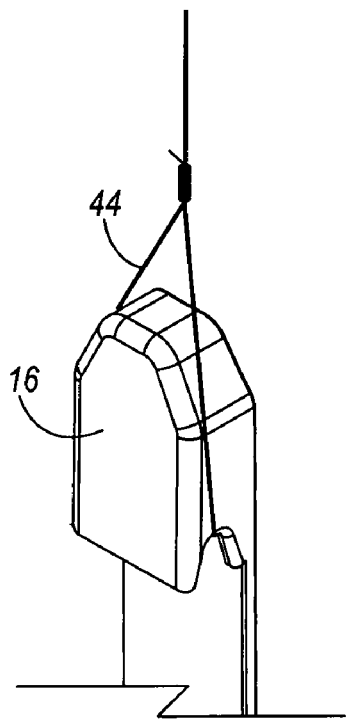
FIG. 8  FIG. 9
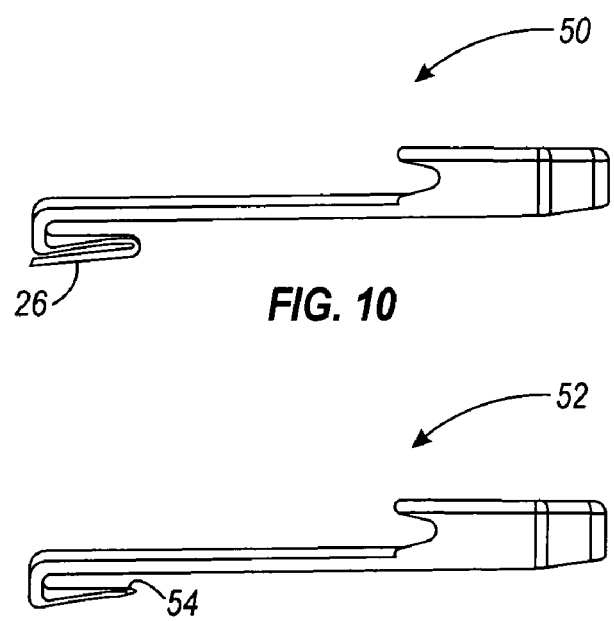
FIG. 10
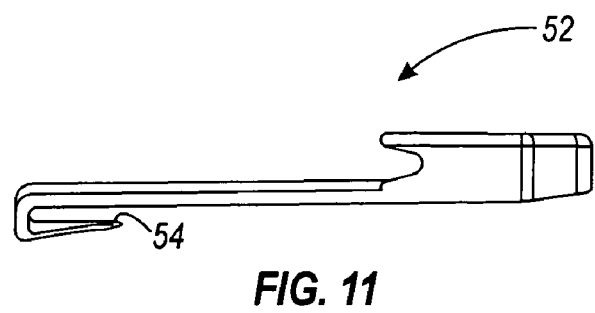
FIG. 11

FISHING ACCESSORY AND ASSOCIATED METHODS

CROSS REFERENCE TO RELATED APPLICATIONS

This application claims priority under 35 U.S.C. § 119 to commonly owned U.S. provisional patent application Ser. No. 60/534,513 filed on Jan. 6, 2004 now abandoned entitled "EASY USE FISHING HOOK ATTACHMENT AND PROTECTION DEVICE", which is incorporated by reference herein.

FIELD OF THE INVENTION

This invention relates to fishing accessories. In particular, this invention is drawn to fishing accessories and techniques for attaching accessories to a fishing rod or reel. In one example, the invention relates to a fishing hook attachment and protection device for providing an easy to install and easy to use device that secures and/or conceals the point and barb of a fishing hook or lure. In other examples, the invention relates to techniques for attaching desired fishing accessories to a fishing rod or reel.

BACKGROUND OF THE INVENTION

Hook attachment and other fishing-related devices have been used with fishing rods and reels. Typically, prior art hook attachment devices are comprised of a wire loop permanently attached to a fishing rod body. This type of hook attachment device is typically provided by rod manufacturers.

One type of prior art hook attachment device provides the ability to hide hooks in the handle of the fishing rod. This type of device is available as a complete fishing rod assembly or as a separate handle that can be attached to a rod in place of an existing handle. Other types of prior art devices comprise attachments for existing rods that clamp onto the rod using an o-ring. One example of this type of device is a single rubber or soft plastic piece that stretches so that it can be slid over the rod and eyelets and left on the rod typically around the handle. This device has a smaller ring attached to the larger ring where a hook can be attached. Other types of prior art devices use a plastic box that snaps onto the fishing rod and encloses a lure inside. Hook bonnets are plastic pieces formed to slip onto treble hooks to cover the points. Lure wraps use flexible material pieces that can be wrapped around a lure or hook.

There are various problems and disadvantages with prior art hook attachment devices. For example, when hooks are stored by hooking them onto the eyelets of a fishing rod, the hook causes abrasions on the eyelets, which causes abrasions on the fishing line as the line slides through the eyelets during use. This can cause pre-mature line breakage and weakening of the fishing rod eyelets.

Another problem with some prior art hook attachment devices is that during storage of the hook, the hook point and barb are exposed and can catch on the fishing lines, or the hands of a user.

Other problems with some prior art hook attachment devices relate to the method of attachment to a rod or reel, as well as the lack of convenience of use of the device. The type of device mentioned above for hiding hooks in a fishing rod handle is expensive since the user must purchase a new rod with the handle attached. The user can purchase a separate handle, but the user must then modify their existing rod by cutting off the existing handle and gluing on the new handle. Furthermore this type of device works only with straight handled rods, and not with pistol grip rods. One type of prior art device attaches to a fishing rod using an o-ring stretched from one end of the device, around the rod, to the other end of the device. This type of device is subject to movement on the rod which can result in loosening of the fishing line and releasing of the hook. Also, a device using O-rings is subject to weakening from general environmental exposure and can break. In devices where a hook is hooked into a rubber loop, the act of hook attachment and removal can cause abrasions in the attachment loop and eventually cause it to break. The type of device mentioned above that uses a plastic box that snaps onto the fishing rod and encloses a lure inside also has inherent problems. This type of device is bulky and takes some considerable time and effort by a user.

Hook bonnets also have inherent problems. For example, they must be stored and retrieved by the user, making the bonnets themselves an extra burden to maintain and keep up with when not in use. Hook bonnets also take considerable effort to install onto the hooks. Lure wraps typically completely wrap the hook and lure to cover the hook and lure with a protective material. This again, is bulky, time consuming, and difficult to keep up with and store when not in use.

It can be seen that there is a need for a new easy-use fishing hook attachment and protection device that secures and/or conceals the point and barb of a fishing hook or lure. There is also a need for better ways to attach other fishing accessories to a fishing rod or reel.

SUMMARY OF THE INVENTION

An apparatus of the invention is provided for a fish hook retainer for use with a fishing rod and reel including a first surface adapted to be secured to a fishing rod or reel, and one or more walls coupled to the first surface defining a cavity having at least one open side for receiving a fish hook.

Another embodiment of the invention provides a fishing rod accessory device including a first portion adapted to at least partially be disposed between a fishing reel mounting flange and a fishing rod to secure the first portion to the fishing rod when the fishing reel is mounted to the fishing rod, and a fishing accessory coupled to the first portion.

Another embodiment of the invention provides a method for attaching a fishing accessory to a fishing rod and fishing reel combination, the method including providing a base for holding the fishing accessory, and clamping at least a portion of the base between the fishing rod and the fishing reel.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIGS. 8 and 9 are partial perspective views of the pocket of the hook retainer in use.

FIGS. 10 and 11 are examples of alternate hook retainers.

DETAILED DESCRIPTION

The general purpose of the present invention, which will be described subsequently in greater detail, is to provide a new, easy-use fishing hook attachment and protection device that has many advantages over other devices. In addition, the present invention includes techniques for attaching other fishing accessories to a fishing rod and/or reel.

In one example, the present invention generally comprises a molded or appropriately manufactured material with a shape suitable for fitting beneath the mounting flange or mounting seat of a fishing reel with a bent or curved feature that provides a surface area over the top side of the reel mounting flange so that the attaching mechanism of the reel will constrain the device to between the mounting flange of the fishing reel and the attaching mechanism of the rod. The opposite end of the device is coupled to any desired fishing accessory. In one example, the fishing accessory is a fishing hook retaining device that is shaped in such a way as to provide a cavity to secure and/or conceal a fishing hook or lure's point and barb. Therefore, in one example, a device may be comprised of an elongated structure having a first end and a second end. The first end includes a mounting feature and having an appropriately shaped and sized body to allow it to be clamped under the fishing reel mounting seat. The second end includes a cavity that is used to support the fish hook and protect the points from exposure. In other examples, the cavity is mounted in alternate manners, such as a strap, an adhesive, or any other desired manner. In other examples, the fishing accessory may be a light, a fish strike sensor, a fish line cutter, etc.

Figure 1:
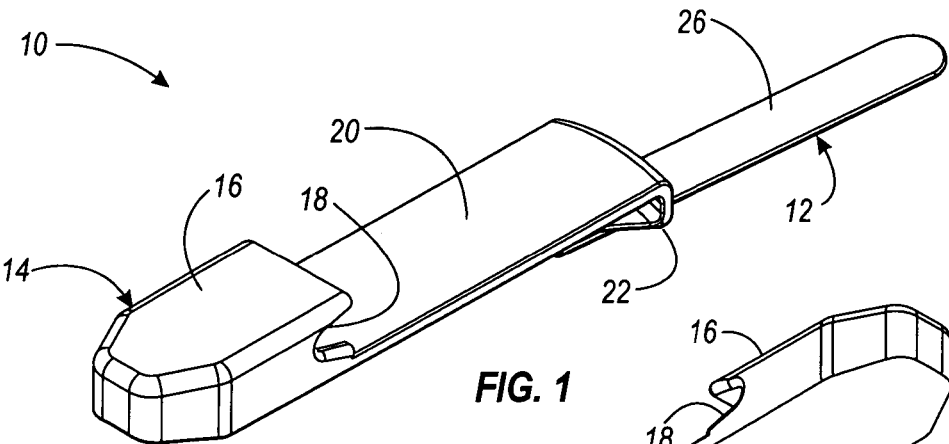
FIG. 1 is a perspective top view of a hook retainer.
Figure 2:
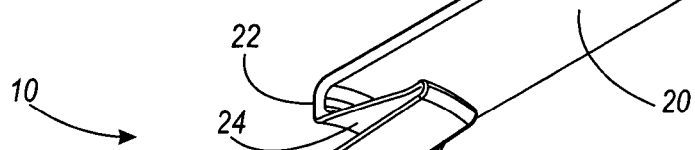
FIG. 2 is a perspective bottom view of the hook retainer shown in FIG. 1.
Figure 3:
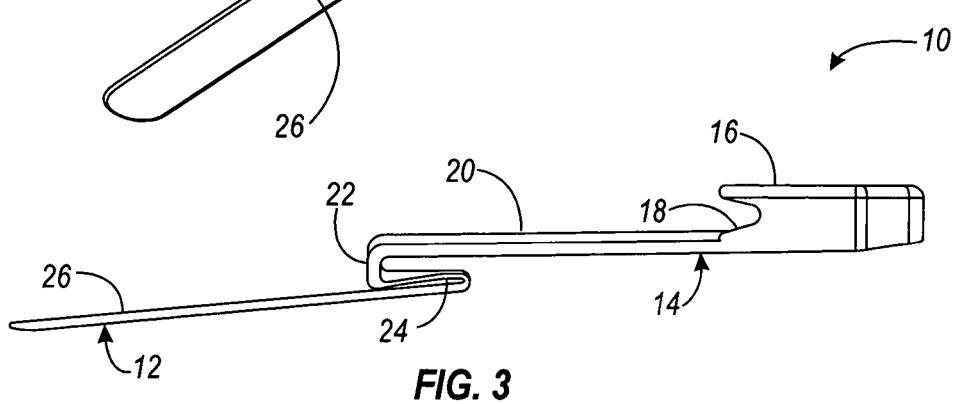
FIG. 3 shows a side view of the hook retainer shown in FIG. 1.
Figure 4:
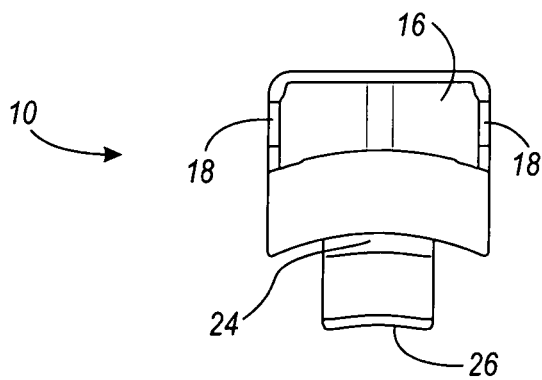
FIG. 4 is an end view of the hook retainer shown in FIG. 1.

Following is a detailed description of examples of the present invention. FIGS. 1–4 show various views of a hook retainer 10 of the present invention. The hook retainer 110 is adapted to be mounted to a fishing rod and reel such that the hook retainer can be used by a user to retain a fishing hook or line when the fishing rod is not in use. FIG. 1 is a perspective top view of a hook retainer 10. FIG. 2 is a similar perspective bottom view of the hook retainer 10. FIG. 3 shows a side view of the hook retainer 10. FIG. 4 is an end view of the hook retainer 10.

Generally, the hook retainer includes a base portion and an accessory portion coupled to the base. The hook retainer 10 is generally an elongated structure having a first end 12 and a second end 14. The first end 12 of the hook retainer 10 is adapted to be mounted between the mounting flange of a fishing reel and a fishing rod (described in more detail below). The second end 14 of the hook retainer 10 includes a cavity or pocket 16 formed therein. Generally, the pocket 16 is a hollow cavity with an open end adapted to receive a fish hook. When a fish hook is inserted into the pocket 16, the fish hook and fish line are held in place. The pocket 16 also protects the point(s) of the hook from exposure. Two notches 18 are formed on opposite sides of the pocket 16 to help guide a hook into the pocket 16, as well as to help retain the hook.

Extending from the pocket 16 toward the first end 12 is a first portion 20 that extends to a generally S-shaped section 22. The S-shaped section 22 defines a channel 24, which is sized to fit over a fishing reel mounting seat of a reel. As shown in FIGS. 2 and 4, the S-shaped section 22 includes an arced surface configured to fit the typical arc radius of a fishing reel mounting seat. The arced body of the retainer 10 also helps to strengthen the device. During installation, the arced surface is slid beneath the reel seat until the bottom curve of the "S" stops the sliding action (described below). The hook retainer 10 also includes a bottom flange 26, which, when installed on a fishing rod, will be clamped between the fishing rod and the fishing reel seat.

The dimensions and configuration of the hook retainer shown in the figures can take many forms, as one skilled in the art would understand. Following is a description of one exemplary configuration of the hook retainer 10, with sample dimensions. Note that these are merely sample dimension, and can be changed, as desired. The hook retainer 10 has an S-shape in general where the first end of the "S" is approx. 0.03 inches thick and 0.3 inches wide with an arced surface to fit the typical arc radius of most fishing reel mounting seats. The arced body also helps to stiffen the device. This portion of the retainer (i.e., the bottom flange 26) is approximately 2.45" long. The body of the retainer continues on this plane for approx. 0.5 inches before curving to form the upper part of the "S". This curve is also accompanied by an increase in width and thickness of the retainer's material. The body now becomes approx. 0.6 inches wide and 0.06 inches thick, again with a curved surface area to fit the radius of most fishing rods. It is this plane that extends over the fishing rod body outward towards the tip of the rod. This plane extends approx. 2.85 inches from the upper portion of the "S" curve. At the end of this plane is the pocket 16 extruding upward from the plane or away from the fishing rod body. The pocket is extruded approx. 0.3 inches tall, in this example. This extruded pocket is approx. 1 inch in length from the end of the device back toward the "S" curve. The nose or end of this retainer is chamfered on both corners of the nose to provide easy finger access to the shaft of the hook that may be attached to the retainer. The two sides of the extruded pocket also incorporate a "V" shaped notch (i.e., notches 18) lying horizontal or parallel to the longitudinal plane of the retainer's body, also horizontal or paralleled to the rod body. The notches in the pocket walls allow the hook shaft to be guided into place easily without precision placement from the user who is trying to store the hook. As previously mentioned there is a notch 18 on both sides of the pocket 16 allowing the user to exercise their dominant hand (left or right) in this action. The body of the extruded pocket is hollow or shelled to accommodate the point/barb portion of the hook and effectively conceal it. The shape of the retainer could be any variation and still provide the intended operation.

Figure 5:
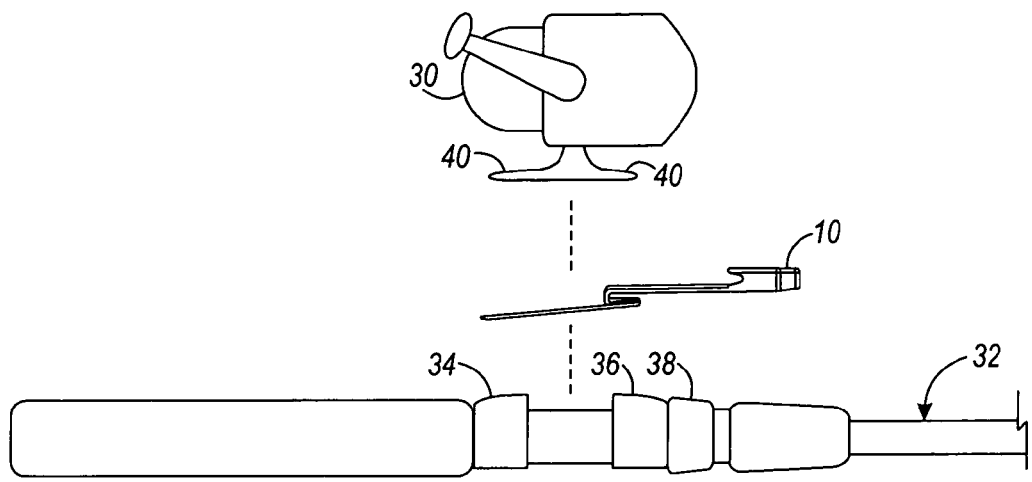
FIG. 5 is an exploded view of a hook retainer, a fishing reel, and a fishing rod.

The hook retainer 10 is configured to be attached to a fishing rod and reel by clamping the first end 12 of the hook retainer 10 between a reel seat and a fishing rod. FIG. 5 is an exploded view of the hook retainer 10, a fishing reel 30, and a fishing rod 32. The rod 32 includes two opposing reel clamps 34 and 36. The rear reel clamp 34 is stationary, and the front reel clamp 36 is movable by turning threaded nut 38. The fishing reel 30 is configured to attach to a fishing rod by inserting the fishing reel mounting seat 40 under the reel clamps 34 and 36, and is secured in place by turning the nut 38. As can be seen in FIG. 5, the first end 12 of the hook retainer 10 is configured to closely fit around a portion of the reel mounting seat 40 when the seat 40 is inserted into the channel 24 of the hook retainer 10.

Figure 6:
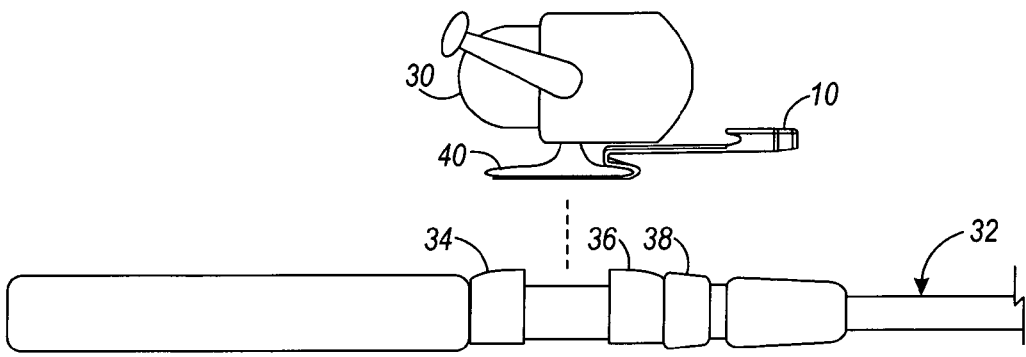
FIG. 6 is an exploded view of the hook retainer, fishing reel, and fishing rod, with the with the bottom flange of the hook retainer fitted with the reel seat.
Figure 7:
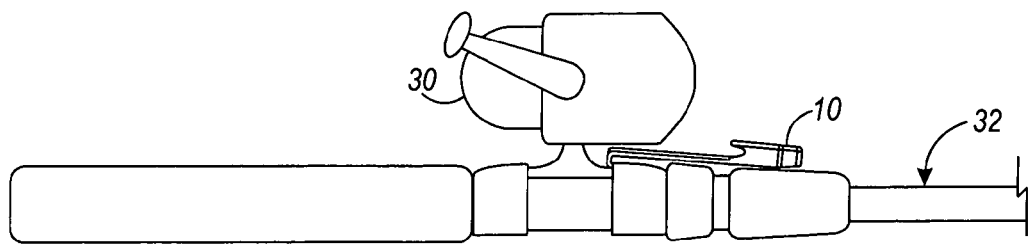
FIG. 7 shows the fishing reel installed on the fishing rod, with the hook retainer secured as shown.

FIG. 6 is an exploded view of the hook retainer 10, fishing reel 30, and fishing rod 32, with the bottom flange 26 of the hook retainer 10 fitted with the reel seat 40. FIG. 7 shows the fishing reel 30 installed on the fishing rod 32, with the hook retainer 10 secured as shown. As shown, the bottom flange 26 of the retainer 10 is mounted between the reel seat 40 and the reel mounting surface of the fishing rod 32. The retainer 10 is installed by removing the reel 30 from the rod 32 by loosening the reel clamp (by turning the nut 38) enough to allow the reel 30 to be tilted back in such a way as to lift the front flange of the reel seat. The retainer 10 bottom flange 26 is then slid directly under the reel seat 40 with the reel seat 40 inserted into the channel 24 until the S-curve of the retainer 10 comes into contact with the end of the reel seat 40, stopping it from going any further. At this point the top surface of the retainer bottom flange 26 should be lying against the bottom surface of the reel seat 40 (FIG. 6). Next, the reel 30 is tilted back down into the mounting position onto the rod 32 without disturbing the position of the retainer 10. The retainer bottom flange 26 is now disposed between the reel seat 40 and the rod 32. The user then tightens the reel clamp by turning the nut 38. The clamp compresses over the lower part of the "S" curve, holding the retainer 10 rigidly in place. The portion 20 and second end 14 of the retainer 10 is disposed on top of the fishing rod or fishing rod handle.

FIGS. 8 and 9 are views of the pocket 16 at the second end 14 of the hook retainer 10 in use. FIG. 8 shows the hook retainer 10 with a hook 42 inserted into the hook retainer 10. The hook retainer 10 can also be used when there is not a hook attached to a fishing line. FIG. 9 shows the retainer 10 with a fishing line 44 having a loop wrapped around the hook retainer 10. A retainer of the present invention can also retain various other devices, as is described in more detail below. When a user stops fishing and wants to store a lure or the hook 42, the user pulls the hook 42 back to the retainer 10 (typically bending the rod) and drops the pointed end of the hook 42 into the pocket 16 located at the end 14 of the hook retainer 10. The notches 18 on one or both side walls of the hook retainer 10 help to guide the hook 42 into place. The tension remaining on the line being pulled back towards the tip of the rod, keeps the hook 42 or line 44 in place. The user can also place the hook 42 or line 44 in the hook retainer 10 and then tighten the line until ample force is applied to keep the hook 42 or line 44 in place.

The shape of a retainer of the present invention can include any desired variation and still provide a desired operation. FIG. 10 is an example of a retainer 50 that is similar to the retainer 10 shown in FIGS. 1–4, except that the bottom flange 26 is shortened. The retainer 50 installs and functions like the retainer 10, although the longer flange 26 of the retainer 10 offers easier alignment during installation and add constraint while being clamped. FIG. 11 is an example of a retainer 52 that is similar to the retainer 10 shown in FIG. 10, without a flange 26. The retainer 52 installs in a similar manner than the retainers 10 and 50 described above. When installed, the portion 54 of the retainer 52 is hooked around the clamp 36 and is sandwiched between the clamp 36 and the reel seat 40.

Figure 12:
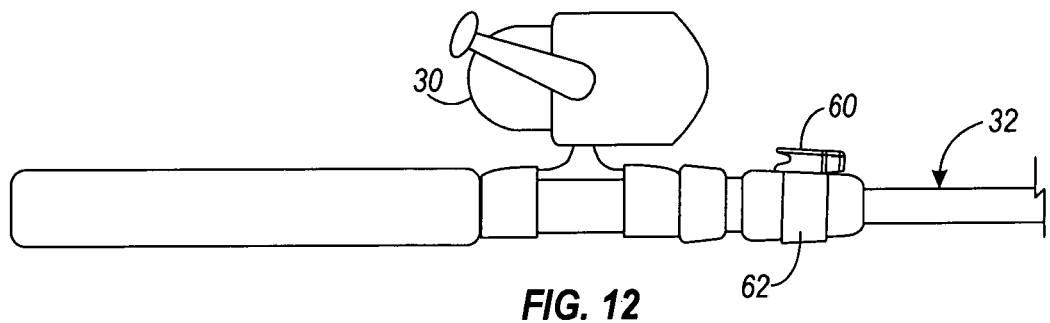
FIG. 12 illustrates an example of a hook retainer attached to a rod using a flexible strap.
Figure 13:
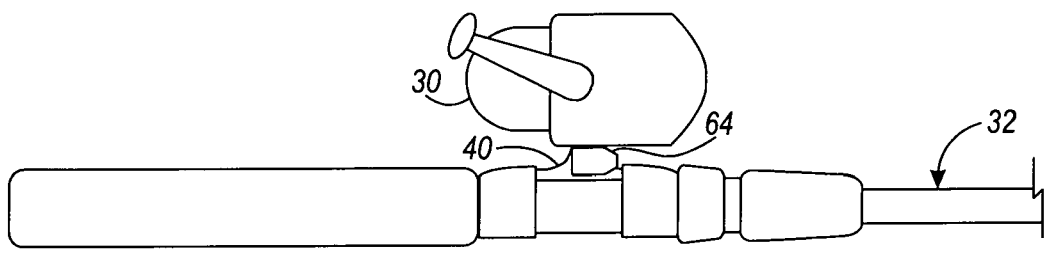
FIG. 13 shows an example of a hook retainer attached to a reel.
Figure 14:
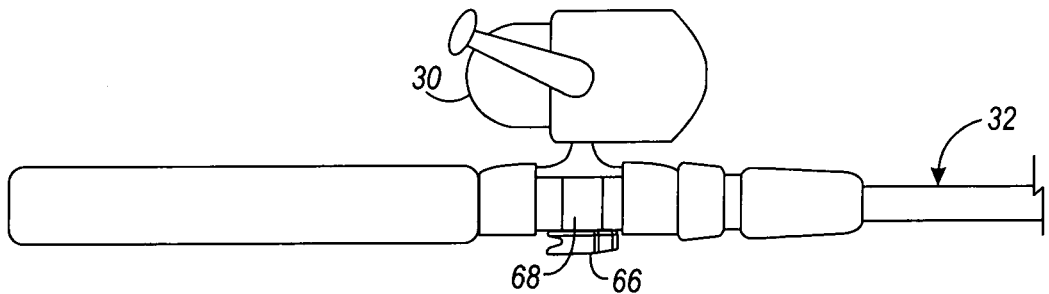
FIG. 14 shows an example of a hook retainer that is secured to a rod by a strip clamped between the rod and the reel seat.

The present invention may be secured to a rod or reel in many ways and locations, as desired. FIG. 12 illustrates an example of a hook retainer 60 attached to a rod 32 using a flexible strap 62. The strap 62 may be secured to the rod 32 using hook and loop fasteners, or any other suitable fastening method. In another example, a hook retainer can be attached to a rod or reel using an adhesive. FIG. 13 shows an example of a hook retainer 64 attached to the reel 30. In this example, the hook retainer 64 is position on the reel seat 40 of the reel 30. The retainer 64 may be attached to the reel seat 40 with an adhesive, rivet, screw or by any other desired technique. In another example, the retainer 64 is formed integral with the reel 30. FIG. 14 shows an example of a hook retainer 66 that is secured to the rod 32 by a strip 68 that is positioned at least partially around the rod 32 and clamped between the rod 32 and the reel seat 40. The hook retainer 66 can be positioned in any located desired, for example, on either side or below the rod 32. In another example, a retainer can utilize a sleeve that slides over one end of the reel seat 40. In another example, a retainer can be secured to the rod or reel using a snap or clip that is adapted to snap or clip in place over the rod or portions of the rod handle, for example. In another example, a retainer like the retainer 10 shown in FIG. 1 can be secured to the rear reel clamp 34. In this example, the pocket of the retainer can be rotated 180 degrees to better receive a hook.

Figure 15:
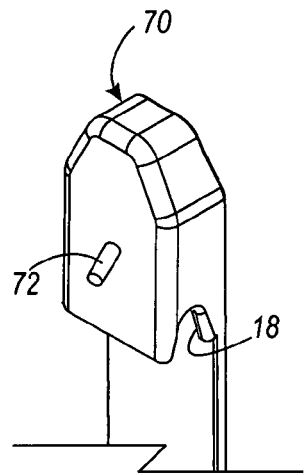
FIGS. 15–17 show examples of a pocket designed to accommodate the retention of a worm hook.
Figure 16:
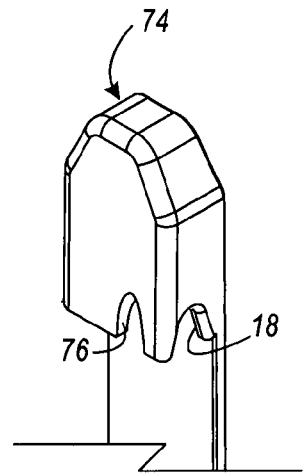
Figure 17:
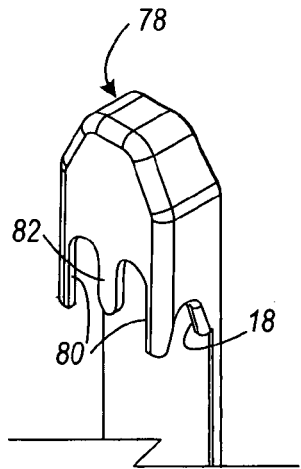
Figure 18:
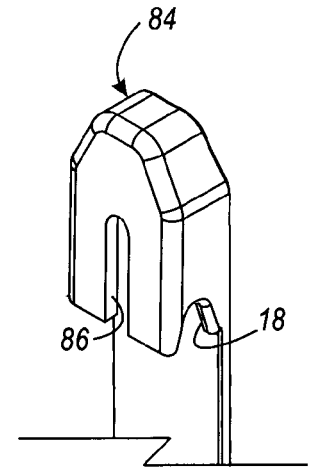
FIG. 18 shows an example of a pocket designed to accommodate the retention of a swivel, weight, leader, or similar device.

As described above, a hook retainer of the present invention can be coupled to a fishing rod and reel in any desired manner. The pocket of the hook retainer can also take on any desired configuration. FIG. 15 shows an example of a pocket 70 having a protrusion 72 extending outward. The protrusion 72 allows a worm hook (with worm body attached) to be stored without disturbing the body of the worm in relation to the hook's point/barb. FIG. 16 shows an example of a pocket 74 having a notch 76 formed on the top surface of the pocket 74 as shown. The combination of notches 18 and 76 also allow a worm hook (with worm body attached) to be stored without disturbing the body of the worm in relation to the hook's point/barb. In this example, the loop portion of a worm hook can be simultaneously inserted into the notches 18 and 76 to retain the hook. FIG. 17 shows an example of a pocket 78 having two notches 80 formed on the top surface of the pocket 78 as shown. The combination of the two notches 80 form a protrusion 82 which allows a worm hook (with worm body attached) to be stored without disturbing the body of the worm in relation to the hook's point/barb. In this example, the loop portion of a worm hook can be simultaneously inserted into the notches 80 (i.e., around protrusion 82) to retain the hook. FIG. 18 shows an example of a pocket 84 having a long notch 86 formed on the top surface of the pocket 84 as shown. The notch 86 is configured to allow a swivel, weight, leader, or similar device connected to a line to be retained. In this example, the device is inserted into the notch 86 to retain the device. Other pocket configurations are also possible within the spirit and scope of the present invention. In the examples discussed above, the pocket is closed at the end opposite the opening. In other examples, the pocket can be open. Also, in the examples shown, the pocket is defined by a plurality of flat walls. In other examples, the pocket can be defined by curved walls, a combination of curved and straight walls, etc.

Figure 19:
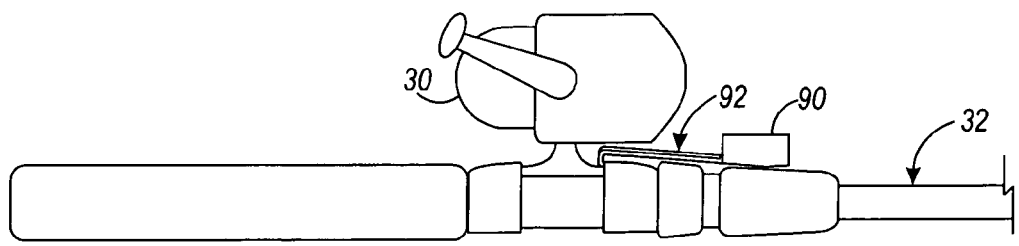
FIG. 19 is a view of a fishing accessory attached to a fishing rod and reel.

As mentioned above, the present invention provides techniques for attaching or securing any desired fishing accessory to a fishing rod or reel. FIG. 19 is a view of a fishing rod 32 and reel 40, including a fishing accessory 90. The accessory 90 is secured to the fishing rod 32 by mounting device 92. In this example, the mounting device 92 is similar to the retainer 10 shown in FIG. 1, except the pocket 16 is replaced by the accessory 90. Therefore, the accessory 90 can be easily and securely attached to the fishing rod 32 by clamping the device 92 between the reel seat 40 and the fishing rod 32 and clamp 34. In one example, the accessory 90 is a light, such as an LED or other type of light powered by an internal battery. In another example, the accessory 90 is a fish strike sensor, used to sense a fish strike. Fish strike sensors are known in the art, so the accessory 90 could take the form of any desired strike sensor, as desired. In another example, the accessory 90 is a fish line cutter. In another example (e.g., like that shown in the previous figures) the accessory is a hook retainer. The accessory 90 can also take the form of any other desired accessory. In another example, an accessory device can include a base portion (e.g., everything except the pocket 16 in the device shown in FIG. 1) adapted to attach to a fishing rod. In this example, the base portion is configured to receive any desired accessory, which can be snapped (or secured in any other desired manner) onto the base. In one example, a kit can be provided that includes a base portion and a plurality of different accessories (e.g., hook retainer, light, fish strike sensor, line cutter, etc.).

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method for attaching a fishing accessory to a fishing rod and fishing reel combination, the method comprising:
    providing a base;
    providing an elongated member for holding the fishing accessory, the elongated member being coupled to the base and extending in a direction generally parallel to the fishing rod;
    forming a generally S-shaped portion in the base which is adapted to fit around a mounting flange of the fishing reel;
    forming a generally flat portion on the base which is adapted to fit between the mounting flange of the fishing reel and the fishing rod when the fishing accessory is attached; and
    clamping at least a portion of the base between the fishing rod and the fishing reel.

2. The method of claim 1, wherein the fishing accessory is a hook retainer, the method further comprising coupling the hook retainer to the elongated member.

3. The method of claim 2, wherein the hook retainer is formed with a cavity configured to receive a fish hook.

4. The method of claim 3, further comprising forming at least one notch in a wall of the cavity to receive the fish hook.

* * * * *